Oct. 22, 1957 M. R. HUTCHISON, JR 2,810,177
PHOTOGRAPHIC FILM CLIP BLANK, FILM CLIP, AND
METHOD OF MAKING SAME
Filed Oct. 30, 1953 3 Sheets-Sheet 1
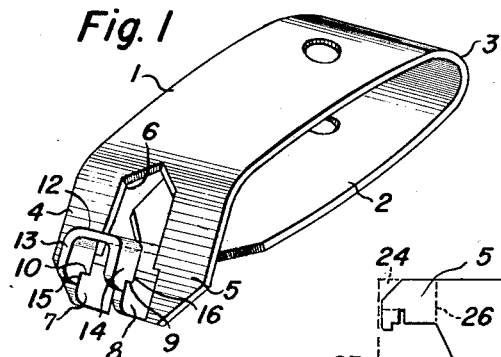
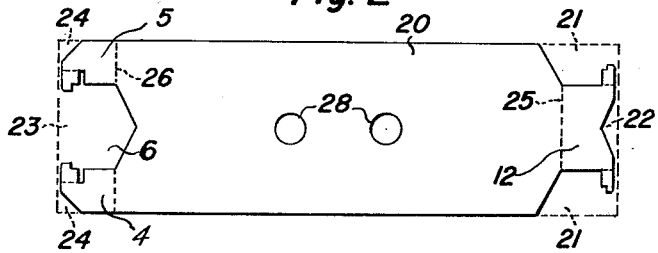
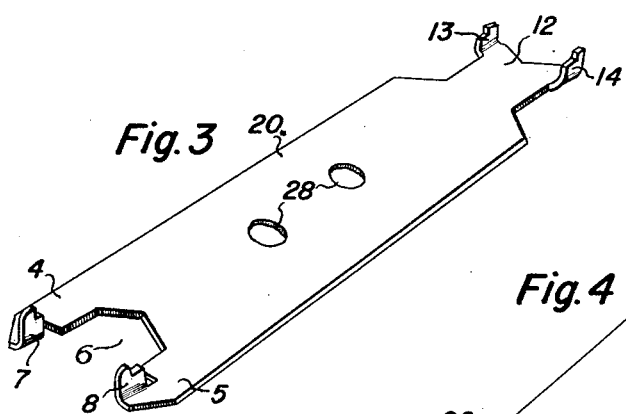
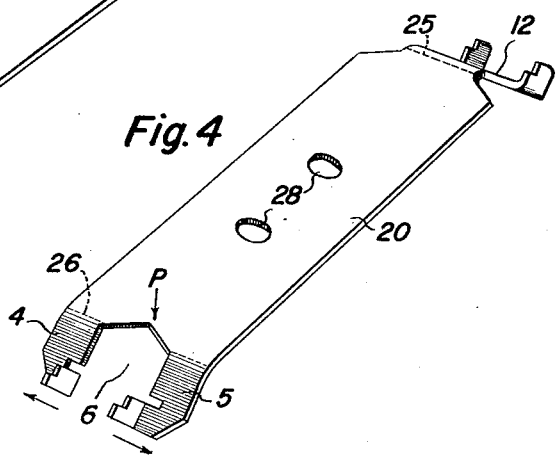
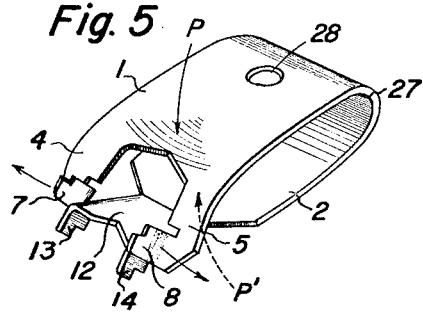
MILLER R. HUTCHISON JR.
INVENTOR.
BY Daniel I. Mayne,
Donald H. Stewart
ATTORNEYS Oct. 22, 1957
M. R. HUTCHISON, JR  2,810,177
PHOTOGRAPHIC FILM CLIP BLANK, FILM CLIP, AND
METHOD OF MAKING SAME
Filed Oct. 30, 1953
3 Sheets-Sheet 2
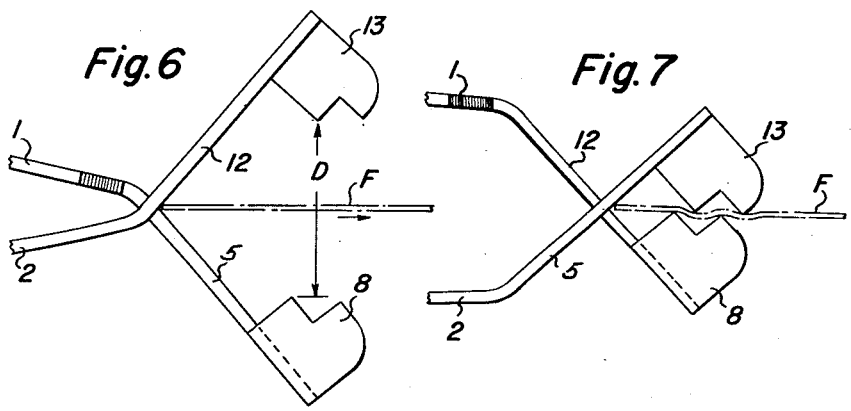
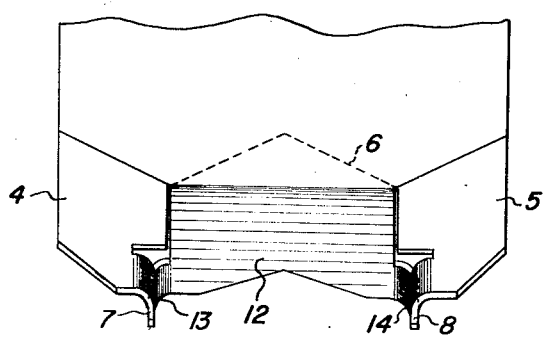
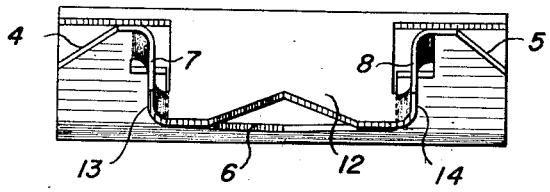
MILLER R. HUTCHISON JR.
INVENTOR.
BY Daniel I. Mayne
Donald H. Stewart
ATTORNEYS

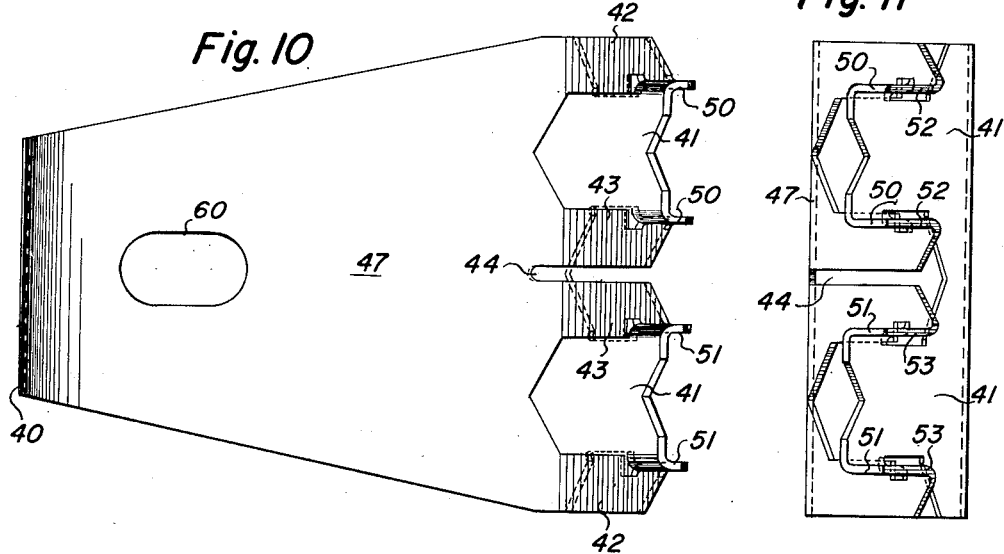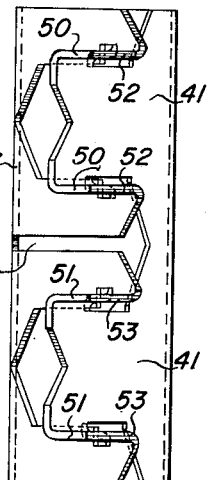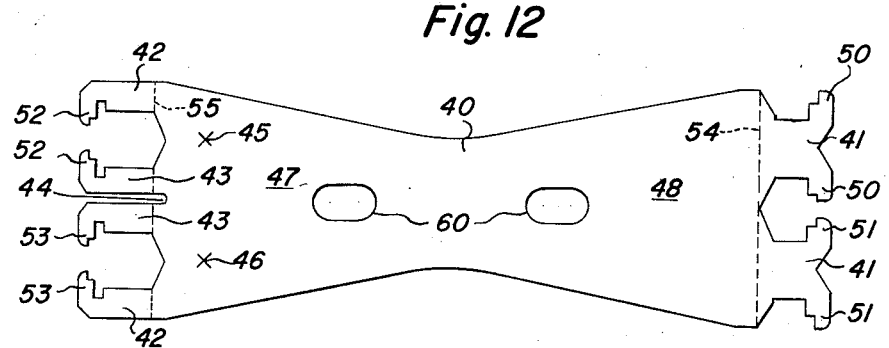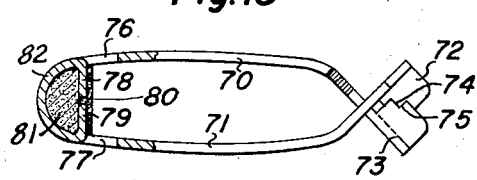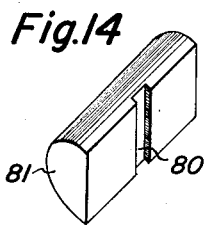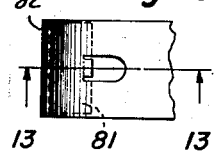
MILLER R. HUTCHISON JR.
INVENTOR.
BY Daniel I. Mayne
Donald H. Stewart
ATTORNEYS United States Patent Office 2,810,177
Patented Oct. 22, 1957

2,810,177

PHOTOGRAPHIC FILM CLIP BLANK, FILM CLIP, AND METHOD OF MAKING SAME

Miller R. Hutchison, Jr., Rochester, N. Y., assignor to Eastman Kodak Company, Rochester, N. Y., a corporation of New Jersey Application October 30, 1953, Serial No. 389,343

6 Claims. (Cl. 24—259)

This invention relates to photography and more particularly to photographic film clips of a type generally used for holding one end of a film during the developing, fixing, washing and drying operations.

Large numbers of film clips are used and in the past it has been difficult to obtain a film clip which would meet all of the requirements. Because the photographic finishing business is often carried on at a high speed, a film clip should be easy to operate, structurally rugged and so designed that there are no horizontal or closely parallel surfaces either on the clip or between the clip and a film held by the jaws of the clip which can collect water, as by capillary attraction, so that this water will later get on the film and leave water marks which cannot be removed and which will mar prints made from such film.

The jaws of a film clip should hold a film tightly, preferably without penetrating, puncturing or marring a film base and the jaws should preferably open quite widely to facilitate introducing a film between the jaws in a darkroom. In addition, the jaws of a film clip should limit the distance a film can enter between the jaws to prevent entering the film too far and possibly marring the picture areas with the teeth.

One object of my invention is to provide a film clip which will meet the normal requirements of photographic finishers. Another object of my invention is to provide a film clip which can be made of a single piece of metal. Another object of my invention is to provide a film clip which can be readily assembled or folded into an operative shape and which resists misalignment. A still further object of my invention is to provide a film clip in which the film-engaging jaws tend to tighten on a film when a film is pulled away from the jaws without separating them. Still another object of my invention is to provide a film clip with jaws which hold spaced areas of a film in a position so that there are no closely parallel planes between a surface of the film and a surface of the jaw which will tend to collect water. A still further object of my invention is to provide a film clip in which a blank is economically formed from sheet metal. A still further object of my invention is to provide a film clip which can be made at relatively little cost from a single piece of metal on suitable automatic machinery. Other objects will appear from the following specification, the novel features being particularly pointed out in the claims at the end thereof.

Coming now to the drawings in which like reference characters denote like parts throughout:

Fig. 1 is a perspective view of a preferred form of a simple type of clip made in accordance with my invention;

Fig. 2 illustrates a blank from which the clip shown in Fig. 1 may be folded;

Fig. 3 shows the blank of Fig. 2 after a forming operation bending jaws on opposite ends of the blank;

Fig. 4 shows the blank after a forming operation bending the jaw carrying arms to approximately 45° with respect to the center portion of the clip;

Fig. 5 shows the clip being bent into a position in which slight further movement will cause the two sets of jaws to spring past each other and into an interengaging position;

Fig. 6 shows a fully open position of the jaws in which they are separated quite widely for the insertion of the end of a film;

Fig. 7 shows the jaws closing upon a film and in a film-clamping position;

Fig. 8 is a fragmentary detail top plan view showing the male and female jaw carrying members in an assembled position with the jaws mating in parallel planes;

Fig. 9 is an end elevation of the clip partially shown in Fig. 8;

Fig. 10 is a top plan view of a multiple jaw clip constructed in accordance with a second embodiment of my invention;

Fig. 11 is an end elevation of the clip shown in Fig. 10;

Fig. 12 is a blank from which the clips shown in Figs. 10 and 11 may be formed;

Fig. 13 is a side elevation of a clip constructed in accordance with a third embodiment of my invention;

Fig. 14 is a perspective view of a lead weight which may be readily attached to my film clips if desired; and Fig. 15 is a fragmentary detail showing a weight retaining lug which may hold a weight in the clip.

In accordance with my invention I prefer to form a film clip of a single piece of metal so that the clip may be blanked out. In the first preferred form of my invention, Figs. 1 to 5, it will be noticed that the blank is a simple one of generally rectangular shape. This feature is useful because but little metal is wasted and, therefore, an economical clip can be made, although stainless steel is frequently used and the metal is generally expensive. In order to provide for proper drainage and to avoid a structure in which horizontal surfaces or capillary attraction can hold water, I prefer to provide a clip in which the closed arms holding the jaws are at substantially 45° to the spring arms of the clip which carry them so that when the clip is positioned in a vertical film holding position, the water will drain down the inclined walls and will not tend to collect between the jaws or between the jaws and a film held by the jaws. Drops of water resulting from improper drainage can readily damage film by watermarking it.

More specifically, the preferred form of clip in Fig. 1 may consist of a pair of spring arms 1 and 2 connected together by a curved wall 3. The jaw-carrying arms 4 and 5 of one spring arm are separated by a slot 6 and constitute a female member. Parallel jaws 7 and 8 are formed from the inner parallel edges of the slot by bending the jaws at right angles thereto. Jaws 7 and 8 preferably each have a pair of teeth 9, 10 although any number may be used. The spring arm 2 carries a tongue which passes between the arms 4 and 5 and closely but slidably fits the sides of the slot 6. This tongue constitutes a male member 12 on the end of which a pair of spaced jaws 13 and 14 are formed by bending the jaws into the same plane as the jaws 7 and 8. Jaws 13 and 14 preferably have two teeth 15 and 16 which cooperate with the teeth 9 and 10.

It will be noticed from Fig. 2 that the above-described clip may be formed from a blank 20 which is substantially rectangular in shape, the only metal being wasted being indicated at the corners 21, the ends 22 and 23 and the corners 24. Thus, this clip can be very economically formed of a single piece of metal. It should be noted that the center line of the teeth 7, 8, 13 and 14 are arranged at 90° to each other and at 45° to the center line of the clip. These angles are important and contribute to the holding power of the clip. The jaws tend to tighten on the film when pulled relative to the clip without opening the clip. In forming this clip, the male member 12 carrying jaws 13 and 14 and the spaced arms 4, 5 which carry the jaw members 7 and 8 are arranged so that in the first-forming operation these jaw members may be bent in a common direction at substantially right angles to the blank 20, as indicated in Fig. 3. In this position a center line through the teeth is at 45° to the remainder of the blank.

The next operation is to bend down the male member 12 along a line 25 and to bend down the spaced arms 4, 5 or female member along a line 26, each of these bends being at substantially 45° from the plane of the blank 20 forming angular offsets in arms 1 and 2 in a common direction opposite that of the jaws. In this position a center line through the teeth will lie substantially parallel to the body of the blank. The next operation as indicated in Fig. 5 consists of setting the center 27 of the clip into a U-shape having an angle of about 35° included between the arms 1 and 2. From such a position pressure is applied in the next operation, as indicated by the arrows P and P' in Fig. 5, the pressure P assisting the spring arm 1 to assume a concave shape when the clip ends meet, thus spreading apart the ends of the arms 4 and 5 sufficiently to allow the male member 12 to be entered between these arms, with the jaws 13 and 14 crowding between the jaws 7 and 8. As soon as jaws 13 and 14 pass by jaws 7 and 8, the two pairs of jaws will immediately spring into mating relation because arms 4 and 5 move back to their original positions. The center line of the teeth is now substantially parallel to the arms of the clip and midway between them. The jaws are guided laterally one relative to the other by the close fit between the male member 12 and the female member formed by the two arms 4 and 5. The above operations can be readily carried out by a suitable automatic machine, such as a multi-slide press.

If desired, apertures 28 may be provided in the clip for hanging the clip from a suitable hanger rod.

Referring to Figs. 6 and 7, when the spring arms 1 and 2 are pressed together, the jaws are moved or separated quite widely by a distance D which facilitates the introduction of a film F between them in a darkroom. However, the distance to which a film end can be passed between the jaws is controlled by the flanks of the crossed arms, 12 on the one hand and 4 and 5 on the other, and as the arms 1 and 2 are released and the jaws approach the film, the film is cammed outwardly so that when the jaws engage the film F, it will only extend inwardly a predetermined amount. It will be noticed from Fig. 7 that when the clip is hung vertically with jaws downward, there are no closely spaced parallel surfaces except the mating edges of the teeth. It will be noticed also from Figs. 1, 8 and 10 that all significant plane areas are pitched downward steeply. Thus, there is no tendency for water retention when the clip with engaged film is hung up wet to drain and dry in an air stream.

From Fig. 8 it will be noticed that the male member 12 closely fits the edges of the slot 6 so that the inner edges of the arms 4 and 5 lie closer to the male member 12 than the thickness of the metal of which the teeth are made. Thus, it is impossible after the parts are once assembled to disengage the teeth laterally and even with rough handling, the parts will remain in an operative position.

In Figs. 10 to 12, inclusive, a more elaborate type of clip is shown in which there are multiple sets of teeth. While four sets are shown here, obviously any number could be made. Referring to Fig. 12, the blank 40 may as before be made of a single piece of metal and, in this instance, there are two male members 41 which engage between two female members formed by pairs of arms 42 and 43 which, as indicated in this figure, are slotted at 44. The reason for this slot is that during the jaw-assembling operation, similar to that shown in Fig. 5, in the first clip, it is necessary to have spaced forces applied at areas 45 and 46 so that the spring arm 47 may be depressed at these two regions to spring apart the arms 42 and 43 to permit the male members 41 to pass between them. Without the slot 44 this assembling operation could not readily be performed. With a slot between each set of teeth, any number of sets can be used and can be satisfactorily assembled.

As in the first embodiment of my invention, the assembling steps may be substantially those shown in Figs. 2 to 5, inclusive, in that the clip is bent in the same general manner and the teeth of the clips are likewise similarly bent. The sets of teeth 50 and 51 on spring arm 41 are bent at right angles to the plane of the blank 40. The sets of teeth 52 and 53 at the opposite ends of the clip are similarly bent. The blank is then bent along the lines 54 and 55 at substantially 45° from the blank and then the center of the blank 40 is formed exactly as described for the first clip. The final result is the clip shown in Fig. 10 wherein the teeth of the various jaws meet in a plane and wherein there are no horizontal or parallel surfaces to collect water either in the jaws of the clip or the jaws of the clip and the film held in the jaws. The jaws, being carried by angularly disposed offsets, cause water to drain down these arms much as water drains off a roof.

The clips shown in Figs. 10 to 12 may, if desired, be provided with apertures 60 so that they may be hung on hanger rods.

Referring to Fig. 13, it is frequently desirable to provide film bottom clips with weights for holding taut a film being processed in a vertical position. Here I show a clip having arms 70 and 71, jaws 72 and 73 and teeth 74 and 75 which may be of either of the types or any other embodiment of my invention. In this instance, there are apertures 76 and 77 for hanging up the clip but here fingers 78 and 79 are struck from the openings, folded inwardly into a recess 80 of a lead weight 81 which, as shown in Fig. 14, is of the proper size to be cradled by the rounded end 82 of the clip.

In addition to serving as a means for weighting the clip, the weight 81 can readily be made to change the spring characteristics of the clip by providing an unyielding support for the curved portion 82 thus limiting the spring deflection of the arms 70 and 71. This may be useful in some cases where a comparatively narrow metal band is employed at the center of the clip as may be necessary for the clip to be carried on certain hangers.

In the application and claims I have referred to the arms 1 and 2 as being "substantialy parallel." This term is intended to include arms which are actually bowed or curved somewhat but which nevertheless extend in a generally parallel relationship.

From the preferred embodiments of my invention shown in the above drawings, it will be readily seen that the clip described herein satisfactorily meets the requirements of photographic film clip users in that the clip is ruggedly made from a single piece of formed-up metal. It may be fabricated inexpensively on suitable machinery. It is so arranged to avoid horizontal surfaces and close parallel surfaces between the jaws of the clip themselves or the jaws of the clip and a film hung between them. Therefore, capillary attraction is largely, if not entirely, avoided and gravity assists good drainage. The jaws hold a film firmly and tighten upon a film when the latter is pulled in a direction away from the jaws without releasing the jaws. This is due to the angle of and the shape of the jaws and is a very desirable feature.

Having thus described my invention, what I claim as new and desire to secure by Letters Patent of the United States is:

1. A film clip as defined in claim 4 characterized in that the film clip includes a plurality of pairs of jaws with mating teeth.

2. A film clip as defined in claim 5 characterized in that the offset portions of the clip may include a plurality of pairs of jaws with mating teeth.

3. A method of making a one piece film clip comprising punching out a metal piece into the required blank for the clip including pairs of lugs to form teeth, bending the lugs longitudinally in one direction at right angles to the blank, bending extensions transversely in the opposite direction at approximately 45° to the blank to form offsets carrying the teeth, bending the clip transversely in the second direction midway between the ends to form a generally U-shaped bend, the edges of the pairs of lugs lying in parallel planes and spaced equally apart, and assembling the teeth in parallel mating relationship by applying a springing transverse pressure on one arm of the clip near and to one side of the teeth to bend the arm transversely into a temporarily concave shape transversely of the arm whereby one pair of teeth may be separated temporarily and may spring past the other set of teeth and may be retained in the same plane as the mating teeth when the temporarily applied springing pressure is released from the one arm of the clip.

4. A photographic film clip comprising a one-piece, U-shaped metal strip forming a pair of spaced arms lying in a substantially parallel relationship to a center of the clip defined by a plane passing midway between and substantially parallel to the pair of spaced arms, each arm including an angular offset portion lying at an angle to the parallel arms and lying one across the other, being extended across the center of the clip and one arm having a slotted end forming a female member, the other arm having a narrowed end and constituting a male member adapted to be guided by the female member as the arms are moved to and from the center of the clip, both the male and female members including jaws formed by flanges at right angles to the lateral edges of the offset portions of the arms lying across each other, and jaws including mating teeth meeting in coplanar planes substantially parallel to the center of the clip, that portion of the offset portion of each arm carrying the jaws diverging outwardly from the center of the clip to drain solution therefrom when the clip is suspended with the parallel arms in a vertical position.

5. A photographic film clip comprising a single piece of metal of U-shape having generally parallel arms, each extending substantially parallel to a center plane of the clip extending midway between the arms, an offset portion on each arm inclined from the parallel arm at substantially 45° therefrom and diverging downwardly and outwardly after crossing each other about the center plane of the clip when the clip is suspended vertically to drain solution from the clip, a plurality of jaws carried by the lateral edges of the crossing and diverging portions at right angles to the lateral edges thereof, each pair of jaws including mating teeth meeting in coplanar planes substantially parallel to the center plane of the clip and whereby a film, held by the teeth, is spaced from each offset inclined arm to prevent solution from collecting therebetween when the clip is suspended vertically.

6. A photographic film clip comprising a single piece of metal of U-shape having arms extending generally parallel to a center plane of the clip, an offset portion on the end of each arm crossing each other at the center plane of the clip and extending downwardly and outwardly therefrom when the clip is in a vertical position, jaws carried by each offset portion at the lower spaced ends thereof and on the lateral edges thereof at right angles to the downwardly and outwardly extensions of the arms, teeth on one jaw adapted to mate with teeth on the other jaw to grip the end of a film, the teeth mating along the center plane of the clip and meeting in coplanar planes substantially parallel to the longitudinal axis of the clip so that a film may be suspended along the center plane of the clip whereby the crossing arms inclined downwardly and outwardly provide drainage surfaces inclined away from a film held between the jaws.

References Cited in the file of this patent
UNITED STATES PATENTS

| | | |
|---|---|---|
| 471,332 | Bailly | Mar. 22, 1892 |
| 552,273 | Carlson | Dec. 31, 1895 |
| 1,408,448 | Durst | Mar. 7, 1922 |
| 1,844,774 | Locki | Feb. 9, 1932 |
| 2,455,627 | Uhlmann | Dec. 7, 1948 |